United States Patent Office 2,693,921
Patented Nov. 9, 1954

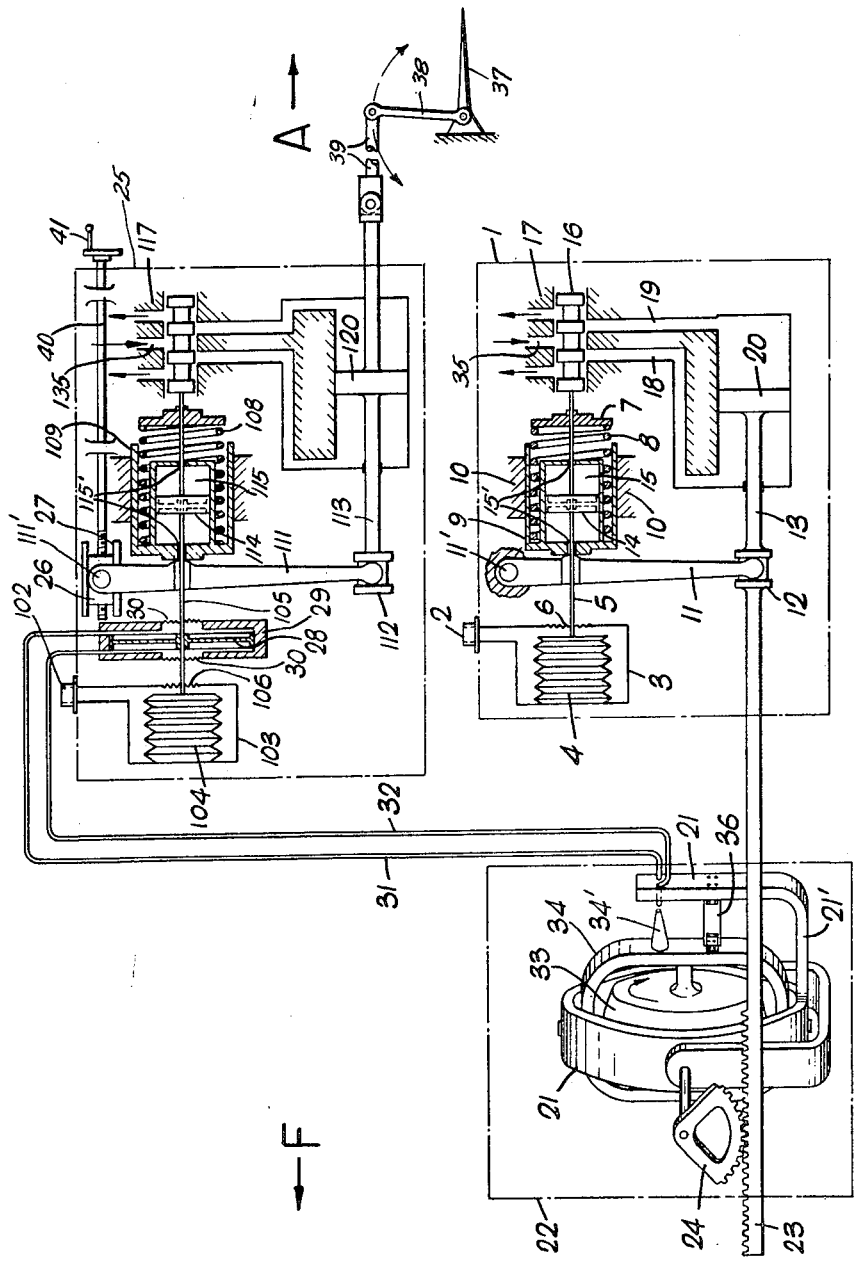

2,693,921

MEANS FOR CONTROLLING THE DEPTH AND ALTITUDE OF SUBAQUEOUS AND AIRBORNE SELF-PROPELLED VEHICLES OR BODIES

John McKissack and Harold Denis Pownall, London, England, assignors to Vickers-Armstrongs Limited, London, England, a British company Application June 16, 1948, Serial No. 33,268

Claims priority, application Great Britain June 20, 1947

5 Claims. (Cl. 244—78)

The present invention relates to means for controlling the depth of self-propelled under-water craft, including torpedoes and submarines, and for controlling the altitude of aircraft and other self-propelled bodies in air. For the sake of brevity, the word "aircraft" will, in the following description, be considered as including all self-propelled bodies whether piloted or pilotless, travelling in the air. An object of the invention is to provide improved means for causing under-water craft to travel at predetermined depths, and for causing aircraft to travel at predetermined altitudes, these means being unaffected by accelerations and decelerations of the under-water craft or aircraft, and being of such a nature that the interval of time between the setting of these means in operation and the instant when they are able to take effective control of the under-water craft or aircraft can be made extremely short. Another object of the invention is to provide a device for the depth control of underwater craft or for the altitude control of aircraft making use of a gyroscope and servomotor but in which the gyroscope does not have to rely upon a pendulum or pendulum-controlled means to detect any inclination of the craft to the horizontal, and thereby obviate a tendency to be influenced by the effect of accelerations and decelerations. In this connection, those devices which hitherto have contained a pendulum-controlled gyroscope have "in rerum natura" required the lapsing of an appreciable interval of time between the instant when the device is set in operation and the instant when the device is able to take effective control of the underwater craft or aircraft, this interval being necessary for the pendulum to bring the gyroscope to its normal operating position.

In addition an object of the invention is to provide an effective depth and altitude controller which contains neither pendulum nor pendulum-controlled means for a gyroscope, and which comprises elevator actuating means responding to rate of change in ambient pressure of the medium in which the craft is moving, a servomotor and gyroscope, damping means with said actuating means, and means measuring inclination by measuring the said rate of change of ambient pressure and translating a signal of the magnitude of this measurement via the said servo-motor and gyroscope to said damping means.

In order that the invention may be clearly understood and readily carried into effect a drawing is appended hereto illustrating somewhat diagrammatically an embodiment thereof, and wherein the Fore and Aft directions are indicated by F and A respectively.

Referring to the drawing, the gyroscope precessing device indicated generally by the reference numeral 1, has an inlet connection 2 through which hydrostatic or atmospheric pressure is transmitted to the interior of a bellows housing 3, within which it acts on evacuated bellows 4. The bellows are secured at their forward end to the bellows housing 3, and at their after end to a co-axial pressure-balance tie rod 5. The bellows 4 are deformed proportionally to the change of pressure of the medium in which the craft is travelling, and this deformation is transmitted via the pressure balance rod 5 to a valve 16 controlling the direction and flow of pressure fluid to a cylinder 20' containing a servo piston 20 as hereinafter explained.

Between the tie rod and the bellows housing is a small flexible diaphragm 6 which allows movement of the tie rod in a fore and aft direction whilst containing the water or air, as may be applicable, within the bellows housing. Attached to the pressure-balance tie rod is a spring-retaining disc 7, against which abuts one end of a compression spring 8. The forward end of the spring is located within and bears against one end of a spring housing 9 mounted to slide axially in bearings 10, the spring holding the housing 9 against a lever 11 in the form of a straight arm intersecting the tie rod and pivoted at 11' at its upper end, its lower end engaging between abutments 12 on the ram rod 13 of the precessing device. The pressure-balance tie rod 5 passes freely through this lever.

Also attached to the tie rod 5 is a servo motor damping piston 14 which slides within a cylinder 15 disposed concentrically within the housing 9 to receive the piston 14. The clearance between the tie rod 5 and holes 15' in each end of the spring housing, through which the tie rod passes is such as to enable the air dashpot formed by the cylinder 15 and the piston 14 to give sufficient damping to ensure the smooth operation of the gyroscope precessing devices, i. e. of the servo motor piston 20 controlled by the said control valve 16 which slides in a valve chest 17. Movement of the valve 16 controls via two passages 18 and 19 the flow of air to and from each side of the servo motor piston 20 carried by the aforesaid ram rod 13 to drive the ram rod 13. Accordingly movement of this piston 20 causes precession of the outer gimbal 21 of the gyroscopic unit 22 by means of a rack 23 on the ram rod 13 and segmental pinion 24.

An L-shaped bracket 21' is rigidly attached to the outer gimbal 21. Across the outer or free limb of this bracket 21' and the inner gimbal 34 is mounted a leaf spring 36, disposed in such a direction across the bracket and the perimeter of the inner gimbal 34, that although it resists movement of the inner gimbal 34 relative to the outer gimbal 21, it causes the deflection of the inner gimbal about its axis to be proportional to the couple applied to it about that axis. That is to say, the precessional characteristic of the gyroscope is used to give a force (acting against the linear deflection of the spring 36) which is proportional to the rate of movement of the bellows 4, i. e. to the rate of change of pressure. A secondary consideration is, of course, rate of change of pitch, a result of the directional quality of the gyroscope in the vertical plane. The change of direction, due to pitching, causes a precession which adds to or subtracts from, that due to the rate-of-change bellows/servo motor system. Air from the pick-off air jet 34' which is carried on the inner gimbal 34 expands on to the ends of the pressure difference pipes 31 and 32 which are connected to the outer gimbal, so that a pressure difference is transmitted by the pipes 31 and 32 to the elevator actuating mechanism, the magnitude of this pressure difference being proportional to the deflection of the inner gimbal 34 about its axis. An elevator is indicated diagrammatically by the reference numeral 37.

The elevator actuating mechanism which is indicated generally by the reference numeral 25 is similar in construction to the gyroscope precessing device described above. Reference numerals indicating parts in the elevator mechanism corresponding to parts of the gyroscope precessing device are increased by 100. Thus the inlet connection of the elevator mechanism is indicated by 102, the bellows housing by 103 and the bellows by 104, and so on. The bellows 104 respond to the change in ambient pressure of the medium in which the craft is moving. In addition, the elevator actuating mechanism 25 contains the pivot 111' of the lever 111, which instead of being fixed, is carried in a cross-head 26 which slides in parallel guides 27, means such as e. g. a feed screw 40 threaded through the head 26 and actuated by a handwheel 41 actuating the slidable head. This is to enable depth or altitude setting adjustment to be carried out as will be described later. There is mounted on the pressure-balance tie rod 105 a fluid pressure deformable diaphragm fixed at its periphery in a fixed housing 29, or, an additional piston 28 which slides in the fixed housing 29 and having a yield or an axial displacement sufficient to afford a small relative movement of the tie rod 105. This diaphragm or piston 28 is actuated by the pressure difference in pipes 31 and 32 which communicate with opposite sides of the diaphragm or piston. The signal from the lines 31 and 32 is added to the bellows unit 104 owing to the diaphragm or piston 28 being fixed to the tension rod 105, whereby any pressure difference on the sides of the diaphragm or piston 28 adds to, or lessens, the pressure load on the bellows 104. Small flexible diaphragms 30 are located between the tie rod and the end covers of the piston housing, which permit movement of the tie rod whilst forming pressure-tight seals between the tie rod and the said end covers.

The apparatus is set in operation by spinning up the flywheel 33 of the gyroscopic unit by either pneumatic or electric means, by applying air pressure to the air jet 34' on the inner gimbal 34, and by applying air or hydraulic pressure to the inlet connections 35 and 135 of the valve chests 17 and 117 of the gyroscope precessing device and the elevator actuating mechanism respectively. The apparatus is thus capable of being set in operation almost instantaneously whatever may happen to be the position of the under-water craft or aircraft at that time.

Increase of hydrostatic or atmospheric pressure at the inlet connection 2 of the gyroscope precessing device compresses the bellows 4 thereof; this causes, through the action of the tie rod 5, the valve 16 of the precessing device to move forward, which in turn allows air or hydraulic fluid to be transmitted to the forward side of the ram piston 20 of the precessing device, whilst allowing air or hydraulic fluid to be exhausted from the after side of that same piston.

This latter piston accordingly moves aft, at the same time through the action of its ram rod 13 and lever 11 causing the spring housing 9 to move aft also. The compressive force in the spring of this housing thus increases, and bearing in mind that the tie rod 5 is fixed to the disc 7, when this force is equal to the hydrostatic or atmospheric force acting on the associated bellows 4, the associated servo motor control valve 16 is returned to its neutral position at which the passages from the valve to the cylinder of the ram are closed off. The ram therefore remains in its new position corresponding to the increased pressure applied at the inlet connection to the precessing device. It will be noticed that, whenever the latter mentioned spring housing 9 has a velocity aft, there will exist a higher pressure on the forward side of the associated pitson 14 than on its aft side and this will cause the associated servo motor valve to return to its neutral position slightly earlier than it otherwise would. This valve is thus enabled to anticipate the further movement of the associated spring housing 9 and this ensures that there is a steady movement aft of the associated ram 20 due to increase of pressure at the connection. In a similar manner, a decrease of pressure at the connection 2 to the precessing device causes its ram to move forward. Consequently, through the action of the said rack and pinion, it will be seen that the rate of precession of the outer gimbal 21 of the gyroscopic unit 22 relative to the craft is proportional to the rate of change of pressure applied at the connection on the gyro-precessing device.

The elevator 37 is operated via any suitable means, e. g. a crank 38 and connecting rod 39 from the ram 113.

The operation of the elevator actuating mechanism is similar to that of the gyroscope precessing device hereinbefore described. Increase of pressure at the connection 102 to the bellows housing 103 and/or a higher pressure in the pipe 31 of the said pick-off means than in the other pipe 32 thereof, will cause the servo motor control valve 116 of the elevator actuating mechanism to move forward, thus transmitting air or hydraulic fluid to the forward side of the ram piston 120 of such mechanism, and exhausting air or hydraulic fluid from the aft side of that piston. This piston 120 and its ram rod 113 accordingly move aft until the force in the spring 108 of the spring housing 109 of the relevant mechanism exactly balances the force on the associated bellows 104 due to the increased hydrostatic or atmospheric pressure applied at the connection 102 to the bellows housing and/or the force on the diaphragm or piston 28 in the cylinder 29 due to the pressure difference in the pipes 31 and 32 leading from the pick-off means. It is thus evident that the position of the ram rod 113 and hence the deflection of the elevators, is determined by the sum of a quantity proportional to the pressure at the connection to the bellows housing and a quantity proportional to the pressure difference across the latter mentioned pipes. The depth or altitude at which the elevators are in the neutral position (e. g. at which the ram piston is approximately in the centre of its travel), whilst if at the same time there exists no pressure difference across the pipes 31 and 32, is obviously determined by the fore and aft position of the said crosshead 26 which carries the appropriate lever pivot pin 111'. It will be shown hereinafter that the absence of a pressure difference across these pipes represents the condition when the under-water craft is running at constant depth or when the aircraft is flying at constant altitude, i. e. a steady condition. Accordingly, the fore and aft position of the crosshead determines the depth or altitude of the craft, and the adjustable crosshead is the depth or altitude control.

It has been shown hereinbefore that the position of the outer gimbal 21 of the gyroscopic unit relative to the craft is determined by the hydrostatic or atmospheric pressure at the connection 2 of the gyroscopic precessing device 1. Consequently the rate of precession of the outer gimbal about its axis, relative to the craft is proportional to the rate of change of hydrostatic or atmospheric pressure. Now it is an inherent characteristic of the gyroscope that the couple exerted on the inner gimbal 34 by the outer gimbal 21 through the said leaf spring 36 is at every moment proportional to the rate of precession in space of the outer gimbal, about its axis. Since the spring is such that it causes the deflection of the inner gimbal relative to the outer gimbal at every instant to be proportional to the magnitude of the couple exerted on the inner gimbal, and since the said pickoff is such that the pressure difference developed across the pipes 31 and 32 is at every instant proportional to the deflection of the inner gimbal 34 relative to the outer gimbal 21, it follows that the pressure difference developed across the pipes 31 and 32 is proportional to the rate of precession in space of the outer gimbal about its axis.

The rate of precession in space of the outer gimbal 21 about its axis is equal to the rate of precession of the outer gimbal relative to the craft plus the angular velocity of pitching of the craft. Thus the pressure difference developed across the pick-off pipes 31 and 32 is equal to the sum of a quantity proportional to the rate of change of hydrostatic or atmospheric pressure and a quantity proportional to the angular velocity of pitching of the craft. It at once follows that there exists no pressure difference across the pipes during steady running conditions at constant depth or steady flying conditions at constant altitude, as was inferred above.

It has moreover been hereinbefore shown that the elevator actuating mechanism is such that the movement of the elevators from their neutral position is equal to the sum of movement proportional to the pressure difference in the said pick-off pipes and a movement proportional to the difference between the hydrostatic or atmospheric pressure and a pre-set pressure, this pre-set pressure being the hydrostatic or atmospheric pressure at the depth or altitude at which the craft is required to run. It therefore follows that the deflection of the elevators from their neutral position is equal to the sum of (*a*) a quantity proportional to the difference between the hydrostatic or atmospheric pressure and that at the steady running depth or flying altitude, (*b*) a quantity proportional to the rate of change of hydrostatic or atmospheric pressure, and (*c*) a quantity proportional to the angular velocity of pitching of the craft.

A form of control such as (*a*) is a necessary condition for any under-water craft required to run at a predetermined depth or for any aircraft required to fly at a predetermined height, whilst the forms of control (*b*) and (*c*) are, if suitably proportioned, sufficient conditions to ensure adequate stability of an under-water craft or aircraft in the vertical plane containing its direction of motion.

We claim:

1. Apparatus for controlling automatically the depth and altitude of subaqueous and airborne self-propelled craft, respectively; said apparatus comprising a gyroscope having inner and outer gimbals, a first valve, first means connected to said valve and responding to the influence of the hydrostatic or atmospheric pressure ambient of the craft so as to transmit a signal to said first valve, a first fluid pressure driven actuator operatively connected to the outer gimbal of the gyroscope so as to precess it about its axis and controlled by said first means responding to the ambient pressure via said first valve to effect changes in the position of said outer gimbal relative to the craft, a resilient connection between the outer and inner gimbals of the gyroscope by which a couple is exerted on the inner gimbal by the outer gimbal proportional to the rate of precession of the outer gimbal about its axis, an elevator, a second fluid pressure driven actuator connected to and actuating said elevator, second means responding to the influence of ambient hydrostatic or atmospheric pressure and a second valve operatively connected to said second means and controlling displacement of said second actuator, and means controlled by the deflection of one of said gimbals relative to the other of said gimbals of the gyroscope and transmitting corrective signals proportional to the rate of change of the pressure due to altitude changes to said second means which responds to the influence of ambient hydrostatic or atmospheric pressure.

2. Apparatus for controlling automatically the depth and altitude of subaqueous and airborne self-propelled craft, respectively; said apparatus comprising a gyroscope having inner and outer gimbals, a first fluid pressure actuated servo motor to precess the outer gimbal of the gyroscope, an elevator, elevator actuating mechanism including a second fluid pressure actuated servo motor to actuate the elevator, a first valve controlling the direction and flow of pressure fluid to the first servo motor actuating said outer gimbal, first means responsive to the change in ambient atmospheric or hydrostatic pressure actuating said first valve whereby the rate of the precession imparted to the outer gimbal relative to the craft is proportional to the rate of increase of atmospheric or hydrostatic pressure applied to said first means responsive to change in the ambient pressure, said elevator actuating mechanism further including a second valve controlling the direction and flow of pressure fluid to said second servo motor actuating the elevator and second means responsive to change in ambient atmospheric or hydrostatic pressure actuating said second valve, resilient means connected across the gimbals yieldingly resisting the movement of the inner gimbal of the gyroscope relative to the outer gimbal and causing deflection of the inner gimbal about its axis to be proportional to the couple applied to the inner gimbal about the latter's axis, means transmitting from the gyroscope to said elevator actuating mechanism a signal indicative of the said deflection of the inner gimbal in such manner that the effective elevator movement is equal to the sum of a movement proportional to the said signal and a movement proportional to the change of the ambient hydrostatic or atmospheric pressure from a predetermined hydrostatic or atmospheric pressure, and means to impose an adjustment on said second means actuating said second valve to predetermine the depth or altitude at which the elevators are in the neutral position.

3. Apparatus according to claim 2; wherein each of said first and second means responding to the influence of ambient hydrostatic or atmospheric pressure comprises a member deformable by changes in ambient pressure of the medium in which the craft is moving and operatively connected to and driving its associated valve, damping means being provided in the connection between said deformable member and the associated valve to impose a smoothing action in the movement of said valve.

4. Apparatus according to claim 2; wherein said means transmitting a signal indicative of the deflection of the inner gimbal to the elevator actuating mechanism includes an air pressure displaceable member to modify the displacement of said second valve due to the operation of said second valve actuating means, two conduits discharging air pressure at one end thereof against opposite sides of said air pressure displaceable member, and an air jet from which air pressure is picked off by the other ends of said conduits, said jet being carried by the inner gimbal of the gyroscope at a position spaced from its pivot axis and said other ends of said two conduits being carried by the outer gimbal so that the displacement of said jet relative to said other ends of the conduits provides a differential between the air pressures picked off by said two conduits which is proportional to the deflection of the inner gimbal.

5. Apparatus according to claim 3; wherein said damping means embodies spring means to which energy is supplied from the connection between the associated deformable member and valve in such manner that when the energy imparted to the spring means has a force equal to the ambient pressure acting on the associated deformable member, the associated valve is moved to the closed position to hold said connection against further movement pending a further change in said ambient pressure.

References Cited in the file of this patent
UNITED STATES PATENTS

| Number | Name | Date |
| --- | --- | --- |
| 413,113 | Pistoja | Oct. 15, 1889 |
| 1,659,653 | Hammond | Feb. 21, 1928 |
| 2,007,515 | Wunsch et al. | July 9, 1935 |
| 2,104,627 | Von Manteuffel | Jan. 4, 1938 |
| 2,130,929 | Rocard | Sept. 20, 1938 |
| 2,191,250 | Fischel | Feb. 20, 1940 |
| 2,364,128 | Carlson | Dec. 5, 1944 |
| 2,415,092 | Frische et al. | Feb. 4, 1947 |
| 2,474,618 | Divoll | June 28, 1949 |
| 2,512,902 | Rossire | June 27, 1950 |